Oct. 9, 1956     H. O. DAY ET AL     2,765,719
MOTOR-DRIVEN AGRICULTURAL HOE
Filed June 19, 1953     6 Sheets-Sheet 4

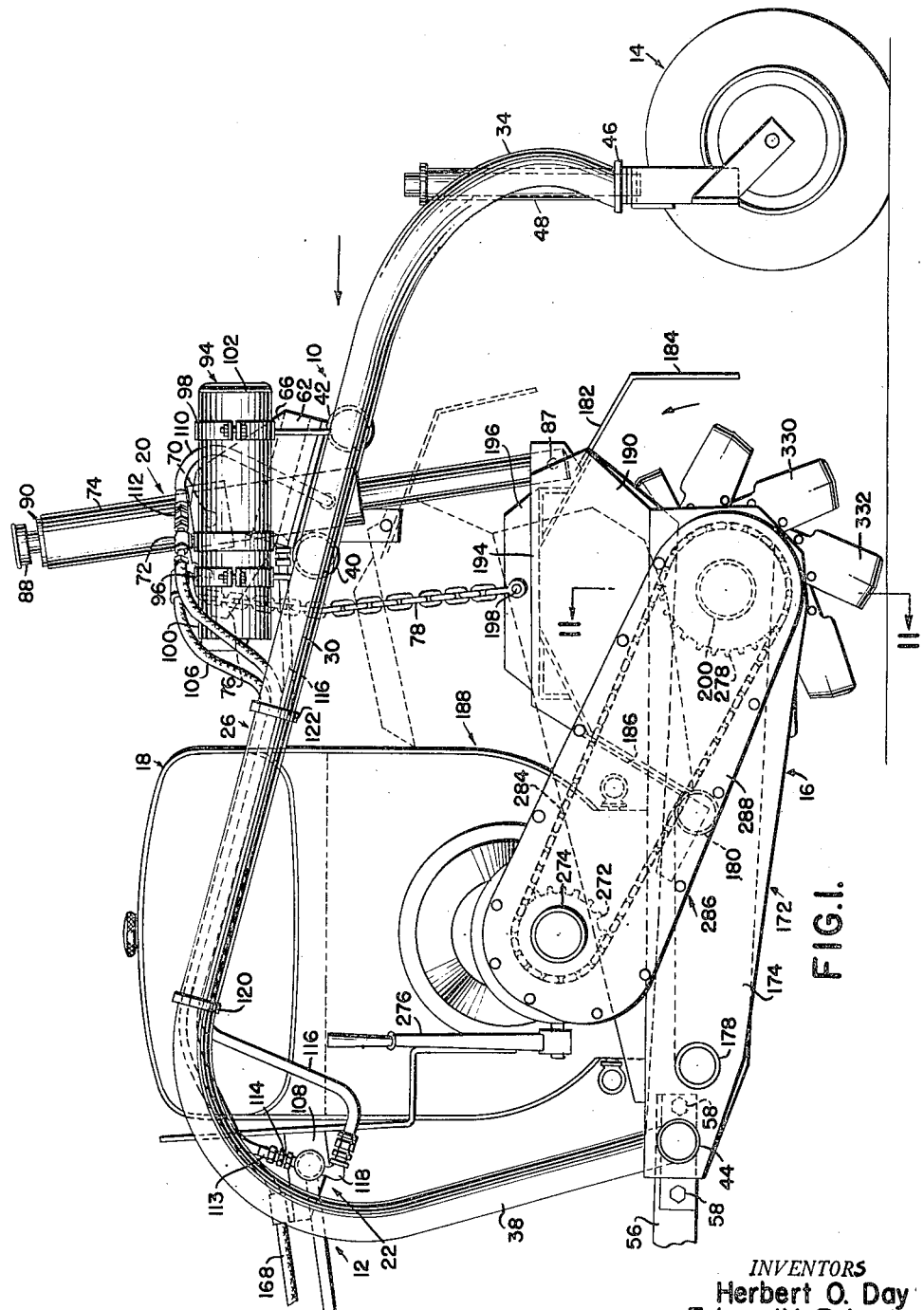

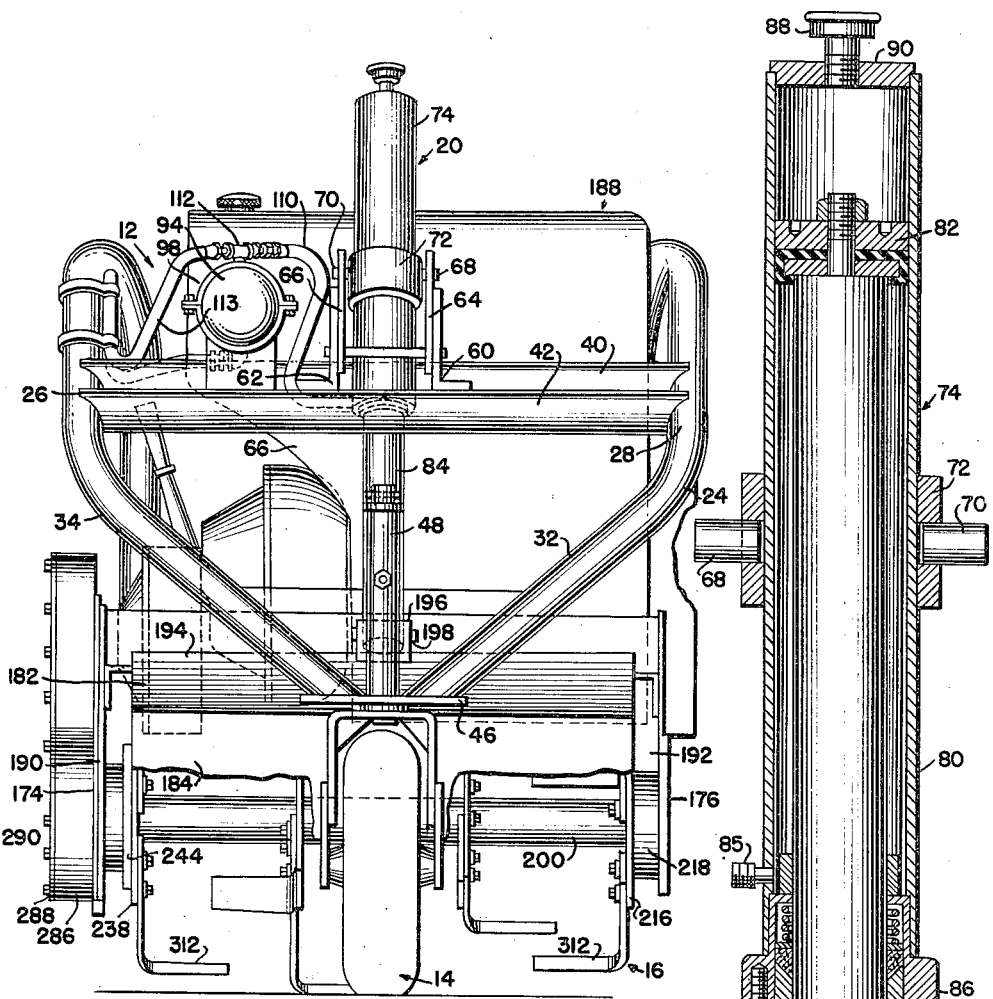

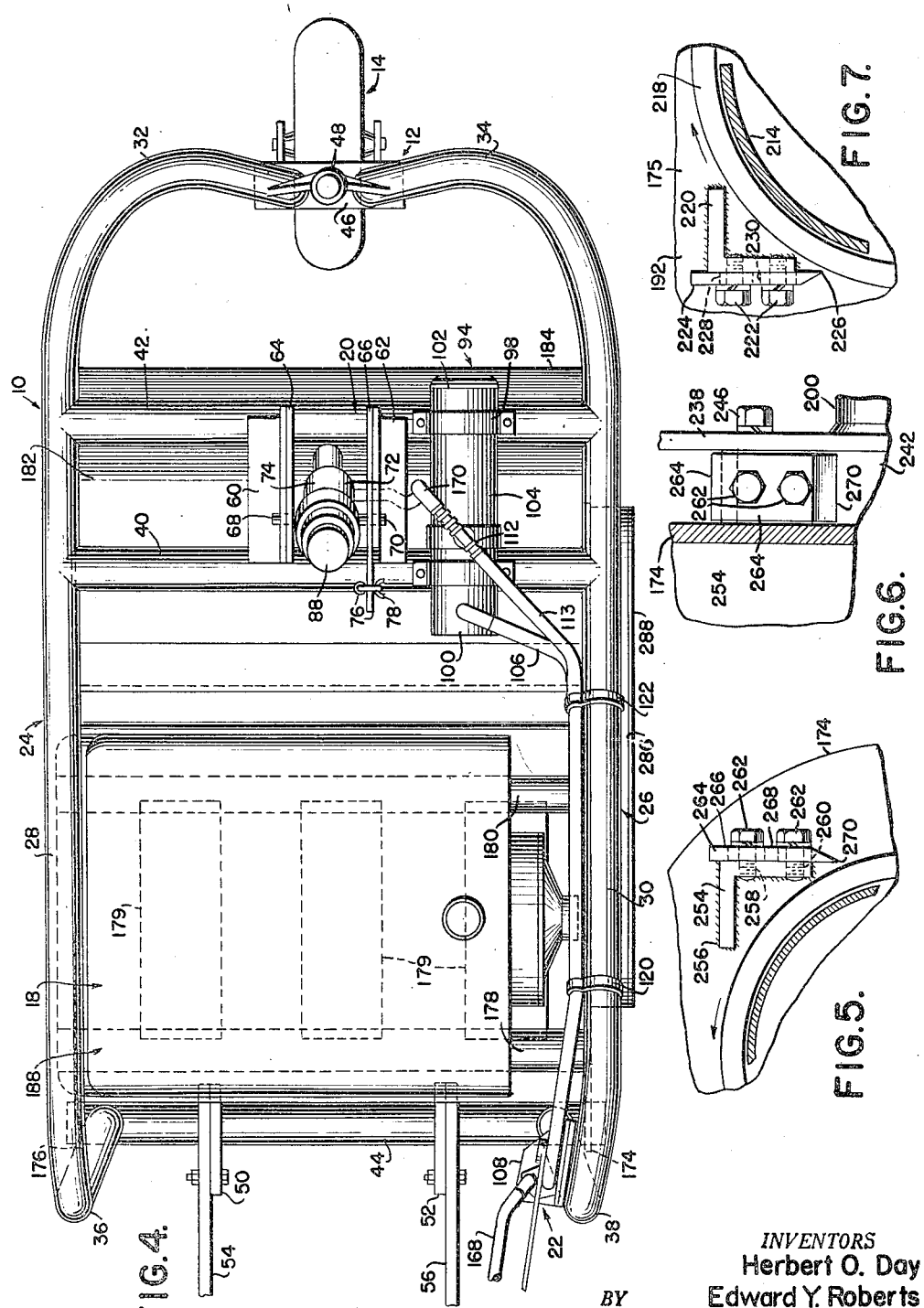

INVENTORS
Herbert O. Day
Edward Y. Roberts
BY
Arthur Middleton
ATTORNEY

INVENTORS
Herbert O. Day
Edward Y. Roberts
BY
ATTORNEY

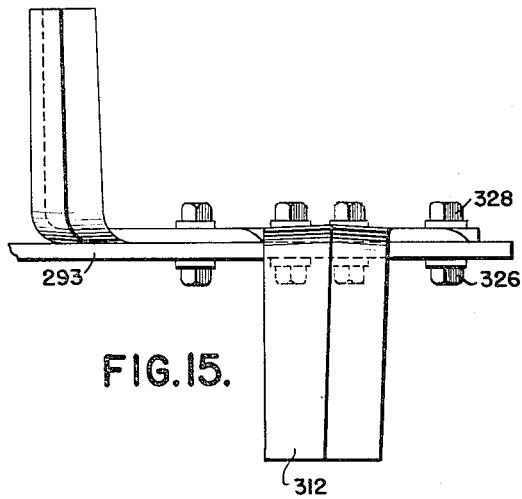
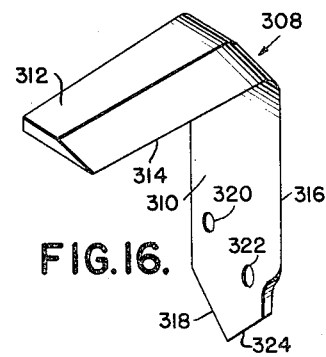
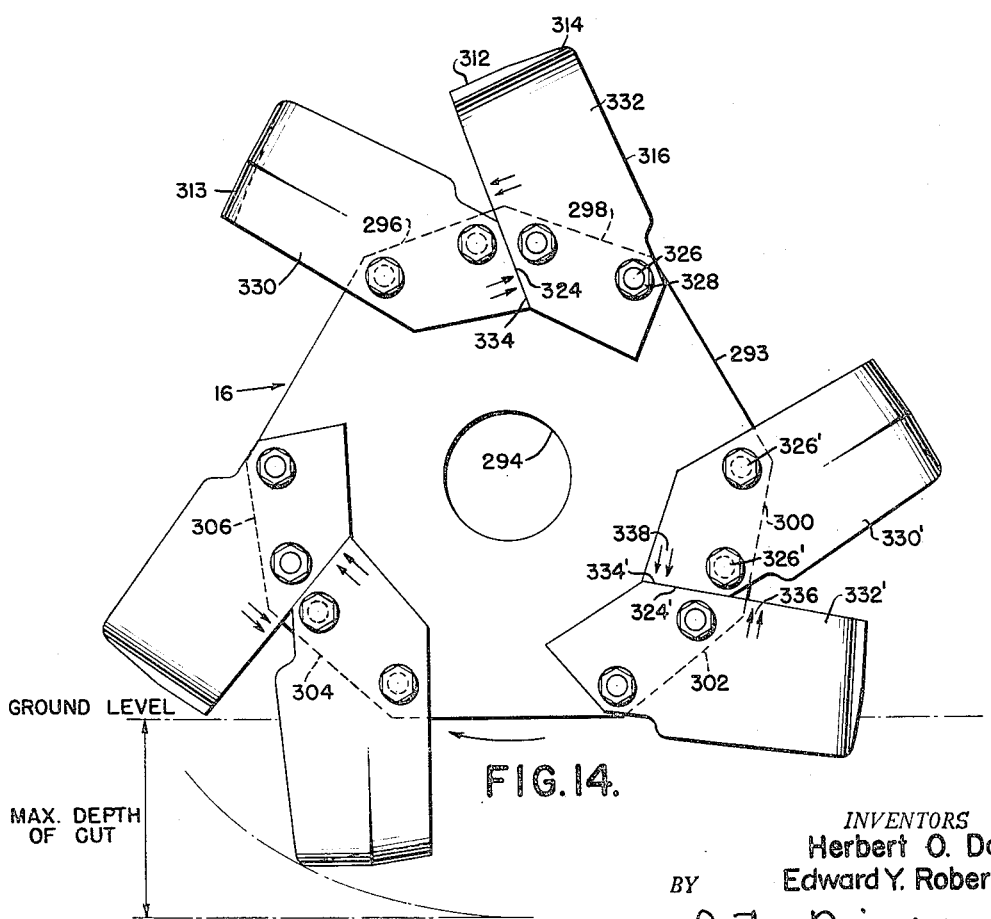

United States Patent Office 2,765,719
Patented Oct. 9, 1956

2,765,719

MOTOR-DRIVEN AGRICULTURAL HOE

Herbert O. Day, Bowling Green, and Edward Y. Roberts, North Baltimore, Ohio; Harold A. James, Toledo, Ohio, executor of said Herbert O. Day, deceased, assignors, by mesne assignments, to L. A. Young Spring & Wire Corporation, Detroit, Mich., a corporation of Michigan Application June 19, 1953, Serial No. 362,782

1 Claim. (Cl. 97—40)

This invention relates to motorized agricultural cultivators of the type having an earth-working rotary element, sometimes called a rotary cultivator. This type is power-driven and may either be mounted on a trailer pulled by a tractor or mounted directly on the trailer itself. But usually the rotary cultivator has one or more ground-contacting wheels contributing to the support of the cultivator which is rather heavy so as to bear down and dig into the earth. The purpose of such a cultivator is to cut weeds; to dig up the soil such as a plow would do; and then to let the soil settle back in a condition equivalent to having been harrowed. To say it is to cut weeds is probably not sufficient because such a cultivator and particularly its rotary element that is rotated at high speeds is designed literally to chew up the weeds and the soil together in admixture so that no further treatment of the soil is needed either to plant it or to keep it cultivated between rows of growing things.

In the treating of soil where some crops have been grown, it takes a very tough and strong machine, such as in the sugar cane growing areas. The cane itself is highly fibrous and some of the weeds that grow among it are even worse. Also these fibers are very long. So it is one object of this invention to devise such a machine that is strong enough to work satisfactorily in sugar cane fields, which present just about the toughest problem known to this type of cultivator. In such a cultivator, the cultivating element is rotary, as explained, and it usually comprises a motor-operated rotor shaft carrying transverse discs of some kind to which are secured cutting or cultivating blades. The cutting blades must cut both vertically and horizontally, so it is another object of this invention to devise a special type of angled or winged cutting blades; a new type of mounting for them that resists loosening or unseating of the blades on their disc; and a shape of blades whose angled portions overlap laterally.

Another object of this invention is to so mount the rotary cultivator on its frame that hydraulically operated adjusting means can be provided to raise and lower the cultivator toward and away from the earth, as well as to control the degree or extent that the cultivator is depressed into the earth. In other words to control the depth of its cut, as well as to elevate the cultivator away from cutting position when the trailer is to be moved toward and away from its place of use. A further object of this invention is to devise such a hydraulic system with its controls so that it is substantially foolproof, and yet the operator only needs to move a single lever that has dual functions to get the cultivator-positioning control that is wanted. The rotary cultivator rotates at high speeds, as much as 250 R. P. M., so it is a still further object of this invention to keep the weeds, grass or cane being cut from grippingly entangling with the working parts of the cultivator and especially those parts thereof that are adjacent to the places where the rotary cultivator is journaled.

These, and possibly other objects that appear hereinafter, can be realized by one embodiment of the invention having a construction comprising a supporting frame that is supported from an earth-engaging wheel at one end thereof and on which frame is a power unit that drives a rotatable earth-working element adjustably, pivotally supported from the frame, the supporting frame being pivoted to a propelling vehicle. The rotary element comprises a shaft journaled at each end in the frame with a plurality of discs thereon of which there is one at each end portion of the shaft and there is at least one intermediate of the end discs. A plurality of free-ended or winged or right-angled cutting blades extend laterally from each end disc, and a plurality of pairs of such blades are carried by one side of the intermediate disc with the free end or wing of each blade of each pair extending in opposite directions. The earth-working element can be adjustably controlled by various means but the preferred form in this invention is a hydraulically operated piston-bearing cylinder that is controlled by a single lever that has dual functions. The lever when moved to a first position closes an electric switch in a circuit for a power unit which thereby pumps fluid into the lower end of the piston-bearing cylinder to raise the piston and therefore raise the earth-working element connected therewith. Upon release of the lever, the switch to the circuit opens stopping pumping of the fluid to the cylinder, and although the lever operates a valve in the return line to the reservoir of the fluid circuit, release of the lever is not such as to open the return line to the reservoir, but on the contrary, the valve maintains pressure in the cylinder to hold the earth-working element in desired vertical adjustment. When it is desired to lower the earth-working element from its previously vertically adjusted position, it is merely necessary to move the lever to a second valve-opening position, thus permitting return of fluid from the cylinder to the reservoir, which results in lowering of the piston and the earth-working element associated therewith.

In order to prearrange for a selected depth of working, for example, in a field, when cultivating where it is necessary to raise the earth-working element when turning and lower the same after turning for continued cultivation, there is provided a chain which has one end attached to the housing for the earth-working element while the other end is adjustably attached to the pivoted supporting frame which adjustably, pivotally carries the housing and earth-working element. With this arrangement, the operator can raise the earth-working element prior to turning and open the return valve in the fluid line to the reservoir after turning by operation of the dual-function lever and the earth-working element will automatically be limited in its dropping movement by the chain or like element.

In the embodiment as disclosed there is also provided means at the bearing supports for the earth-working element which prevent the winding and collection of grass about the ends of the rotary shaft of that element. The means includes a protective ring of cylinder form at each end of and connected for rotation with the rotary shaft and blades carried thereby and encircling the bearing supports for that shaft. Cooperatively adjustably associated with the protective rings and fixedly carried by the frame or housing portion adjacent thereto are cutters or knives the cutting edges of which are approximately tangential to the surface of the protective rings so as to cut away the grass and the like tending to collect on the rotating rings.

The best form in which I have contemplated applying my invention is illustrated in the accompanying drawing wherein:

Fig. 1 is a side elevational view of the entire implement showing the earth-working element in its position preparatory to lowering and the working relationship with the ground level and showing in dotted lines its raised relationship as used during transporting of the implement;

Fig. 2 is a rear elevational view of the implement, parts being broken away to show the earth-working blades;

Fig. 3 is a vertical sectional view through the pressure cylinder employed for raising the earth-working element;

Fig. 4 is a top plan view of the implement of Fig. 1;

Fig. 5 is a side elevational view of cutter means which is associated with a ring or drum encircling the bearing support for the earth-working element shaft at the driving end thereof;

Fig. 6 is a front elevational view of cutter means of Fig. 5;

Fig. 7 is a view similar to Fig. 5 of the means employed in cooperation with the ring or drum encircling the bearing support for the opposing end of the shaft of the earth-working element;

Fig. 14 is a side elevational view of one of the disc and blade assemblies and its relationship to the ground level when in earth-working position;

Fig. 15 is a top plan view of a portion of the assembly of Fig. 14; and

Fig. 16 is a detail perspective view of one of the earth-working blades of the present invention.

Figure 8:
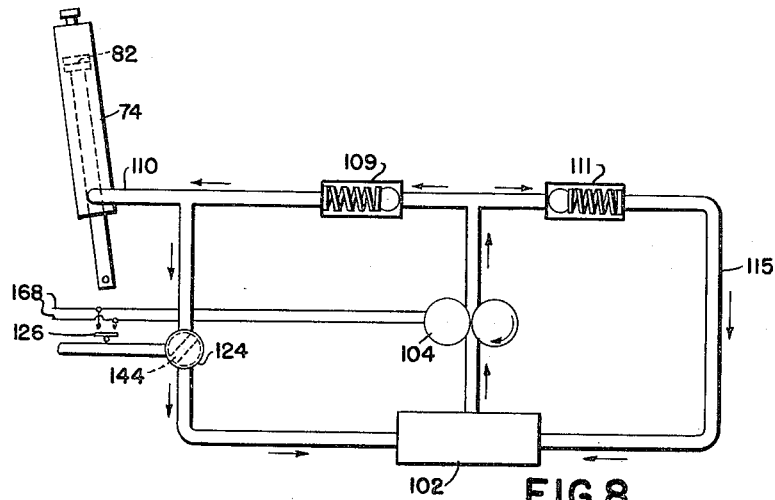
Fig. 8 is a diagrammatic view of the fluid circuit and the push-button switch associated therewith for operating the pump in the circuit.

Referring more particularly to the drawings wherein like numerals refer to like parts throughout, it will be seen that the motorized agricultural cultivator designated generally by the numeral 10 is comprised of a pivoted supporting frame 12, supported at one end by the ground-engaging wheel 14, an earth-working means 16 pivotally supported on the frame 12, a power unit 18 carried by the frame for rotating the earth-working means 16, mechanism 20 for raising and lowering the earth-working means 16 about its pivotal axis, and control means 22 for controlling the raising and lowering operation of the mechanism 20.

Figures 1, 2 and 4 best show the details of the pivoted supporting frame 12 as including a pair of outside longitudinally extending arcuated bars 24 and 26 having inclined shank portions at 28 and 30 terminating in the downwardly and inwardly extending portions 32 and 34 at one end and the downwardly extending portions 36 and 38 at the other end. Rigid cross bars 40 and 42 join the shank portions 28 and 30 and cross bar 44 joins the free ends of the portions 36 and 38 at the attachment end of the frame. At the wheel-supported end of the frame, the bar portions 32 and 34 are joined by the horizontally disposed plate 46 on which is rigidly mounted the upstanding sleeve 48. The pivoted wheel 14 has an upstanding shaft portion rotatably received in the sleeve 48 and held from longitudinal movement relative thereto in a substantially conventional fashion. The cross bar 44 has a pair of attachment plates 50 and 52 rigidly secured thereto in spaced parallel relation. A pair of bars 54 and 56 are bolted at common ends to the plates 50 and 52 by the pair of bolts 58 and at the other ends, the bars 54 and 56 are connected to a tractor or other propelling vehicle (not shown) for pivoting of the entire frame about a substantially horizontal axis so that lateral movement of the frame relative to the propelling vehicle is constrained in order that growing plants will not be damaged by such movement of the frame when the device is passing between rows of such plants.

The cross bars 40 and 42 are joined by a pair of angle irons 60 and 62, the upstanding walls of which have plates 64 and 66 attached thereto to provide pivot supports for the pintles 68 and 70. A sleeve 72 has the pintles 68 and 70 secured thereto in axial alignment and the sleeve 72 encircles and pivotally holds a piston-bearing cylinder 74 relative to the frame. The plate 66 has an extension portion 76 on which an end portion of a chain 78 can be adjustably engaged as will be described.

The cylinder 74 is best shown in Figure 3 as being a single acting type including a casing 80 in which a piston 82 is reciprocably mounted with the rod 84 connected with the piston to move therewith. A threaded nipple is provided at 85 for coupling a pressure conduit with the cylinder chamber below the piston for raising and lowering the same. A suitable packing arrangement is provided about the rod 84 at the casing end 86 and an air breather element 88 is threaded into an opening in the closure 90 at the opposing end of the casing. The rod 84 has an opening 92 therethrough for pivotal connection with the housing supporting the earth-working element so that upward movement of the piston and rod raises the housing and earth-working element as will be described.

The cylindrical casing 94 attached to the cross bars 40 and 42 by the pair of brackets 96 and 98 houses a motor at the end 100, a tank at the other end 102 and a pump intermediate thereof at 104. Also included are a check valve and a relief valve. An electrical cable 106 connects the motor at 100 with the battery on the tractor (not shown), an intermediate portion of the cable being fixed to the valve housing 108 which in turn is fixed to the side bar portion 38 of the frame. A conduit 110 connects the nipple 85 of the cylinder 74 with the pump by the T-connection at 112 and another conduit 113 extends from the T-connection 112 along the side bar portion 30 to the valve 108 for connection at 114. A further conduit 116 extends from the underside of the pump casing to the valve for connection at 118. C-clamps 120 and 122 hold the cable 106 and conduits 113 and 116 to the side bar portion 30.

Figure 9:
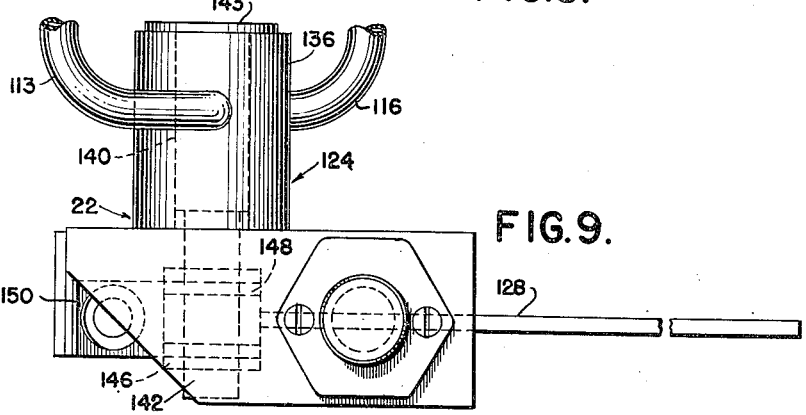
Fig. 9 is a top plan view of the rotary plug valve and switch means employed in the system of Fig. 8.
Figure 10:
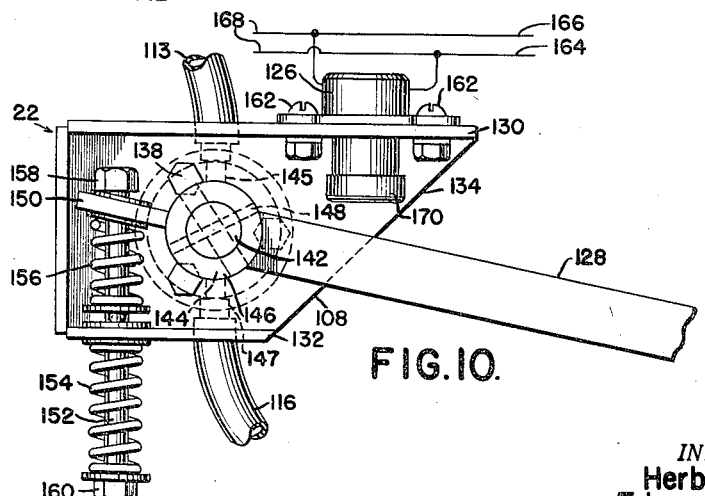
Fig. 10 is a side elevational view of the means of Fig. 9 showing the handle in its neutral relationship with the valve closed and the switch open.

Having reference to Figures 9 and 10, it will be seen that the control means 22 includes the valve 124 and switch 126 carried by the valve housing 108, and a dual function operating handle 128. The housing 108 includes the upper and lower plates 130 and 132 joined by the vertical plate 134 with the rotary valve casing 136 extending outwardly from the vertical wall 134 and secured thereto by the bolts 138. The casing 136 is hollow and has the rotary valve plug 140 received therein with an operating extension portion 142 extending through the wall 134. The valve plug 140 has an opening 144 therethrough which can be selectively aligned with the openings in the casing 136 to which the conduits 113 and 116 are connected. The portion 142 has the sleeve end 146 of the handle 128 secured thereto by the pin 148 extending therethrough. The sleeve end 146 has an apertured ear 150 engaged over the lug 152 which is vertically carried by the bottom wall 132 of the housing 108. Springs 154 and 156 encircle the portions of the lug on each side of the wall 132, with the spring 156 abutting the ear 150 to resiliently urge the same and the handle to a neutral position. The spring 154 urges the lug 152 downwardly so as to hold the headed end at 158 in contact with the other side of the ear 150, the nut and washer at 160 acting as a spring retainer means at the lower end.

The switch 126 is of a push-button type and is bolted to the wall 130 by the bolts and nuts at 162. Conductors 164 and 166 connect the switch with the cable 168 to the battery of the tractor and also have the motor 100 for the pump 104 in circuit therewith. Element 170 is the push-button that is in alignment with the operating handle 128 for the valve.

From the diagrammatic view of Figure 8 and the foregoing description, it will be seen that the handle 128 when in its neutral position maintains the valve 124 in its closed relationship preventing flow of fluid from the cylinder 74 to return to the tank 102, and the switch 126 is open so that the pump 104 is inoperative. Thus, the piston 82 remains in fixed relation within the cylinder 74. When it is desired to raise the piston and rod and the mechanism carried by the lower end of the rod, it is merely necessary to lift the handle 128 in opposition to the spring 156 to push-button-contacting position so as to close the circuit to the pump 104 and pump fluid from the tank 102 through the check valve 109 and conduit 110 into the bottom of the cylinder. When the piston reaches its limit of movement, fluid pressure builds up and overcomes the spring urging in the relief valve 111, opening the same and permitting return of fluid through the by-pass 115 to the tank 102. Release of the handle is accompanied by automatic return to its netural position by the springs 154 and 156 and the switch 126 opens, stopping the pumping of fluid in the system. When it is desired to lower the piston and rod and mechanism carried thereby, it is merely necessary to depress the handle 128 against the urging of the springs 154 and 156 so as to rotate the valve plug 140 to align the opening 144 therein with the conduit connections 145 and 147 for the conduits 113 and 116, thus exhausting fluid from the cylinder 74 through the valve 124 to the tank 102 until release of the handle to its neutral position whereupon the descent of the piston and other means connected therewith is stopped.

Having reference once again to Figures 1, 2 and 4, the support frame 172 for the earth-working means 16 will now be described. The frame 172 includes a pair of elongated side elements 174 and 176, one end of each of which is provided with an opening for pivotal engagement on the cross bar 44. A pair of motor-supporting cross bars 178 and 180 join the side elements in rigid spaced parallelism. At the ends of the side elements remote from the pivotal mountings therefor, there is provided a protective hood or cover 182 for the earth-working element. The hood 182 includes a top plate of longitudinally angulated form having downwardly hanging walls at 184 and 186 to keep the churned earth and chopped grass and so forth from being thrown toward the motor 188 or toward the pivotal wheel 14. The hood 182 further includes a pair of side closure plates 190 and 192 which are disposed inwardly of the side elements 174 and 176 and are secured thereto as by bolts or weld. The top wall 194 of the hood has a longitudinally extending attachment flange 196 through a medial portion of which is extended the pin 198, which pin provides an attachment means for the lower end of the chain 78, above referred to.

A substantially conventional motor 188 such as the internal combustion engine shown is rigidly mounted on plates 179 longitudinally of the support bars 178 and 180 for movement with the entire frame 172. It is to be noted that the side bars 28 and 30 of the main frame are spaced sufficiently far apart as to receive the engine therebetween and the portions 36 and 38 of the side bars are also spaced sufficiently far apart to permit pivoting of the engine to a position therebetween.

The earth-working element disposed within the hood 182 is mounted on a single rotatable shaft 200, which as here shown is hollow. By reference to Figures 11, 12 and 13, the manner in which the shaft 200 is journaled and carried by the pivotally mounted frame 172 will be described. At the non-driving end shown in Fig. 12, the shaft 200 is seen to include an end plug 202 having a reduced diameter portion 204 extending therefrom. A self-centering ball bearing 206 is sleeved onto the reduced diameter portion 204 and held thereon by the retainer 208 and bolt 210 threaded into the end of the plug 202. The outer race of the bearing is seated in the ring 212 which in turn is secured to the frame side element 176 and the side wall 192 of the hood, shown in part, by the bolts 213. A closure ring 214 encircles the bearing assembly and is fixedly carried by the hood and frame. A blade carrying disc 216 of irregular shape is fixed for rotation with the shaft 200 closely adjacent the bearing support and has a ring or drum 218 fixed thereto and extending outwardly therefrom so as to encircle the ring 214 and rotate relative to the latter.

With reference to Figure 7, it will be seen that an angle iron support bracket 220 is fixed to the cover or hood side wall 192 by weld and has a pair of bolts 222 threaded into the vertical portion thereof. A cutter blade 224 having a cutting edge at 226 and a pair of elongated openings 228 and 230 therethrough is adjustably secured to the bracket 220 by the bolts 222 through the slots or openings 228 and 230. The cutting edge is, of course, adjusted into close relationship with the surface of the rotating ring or drum 218, so that while the device is moving over the ground, grass or other growing plants cannot collect about the ring 218 or get into the bearing assembly to cause difficulty.

Figure 11:
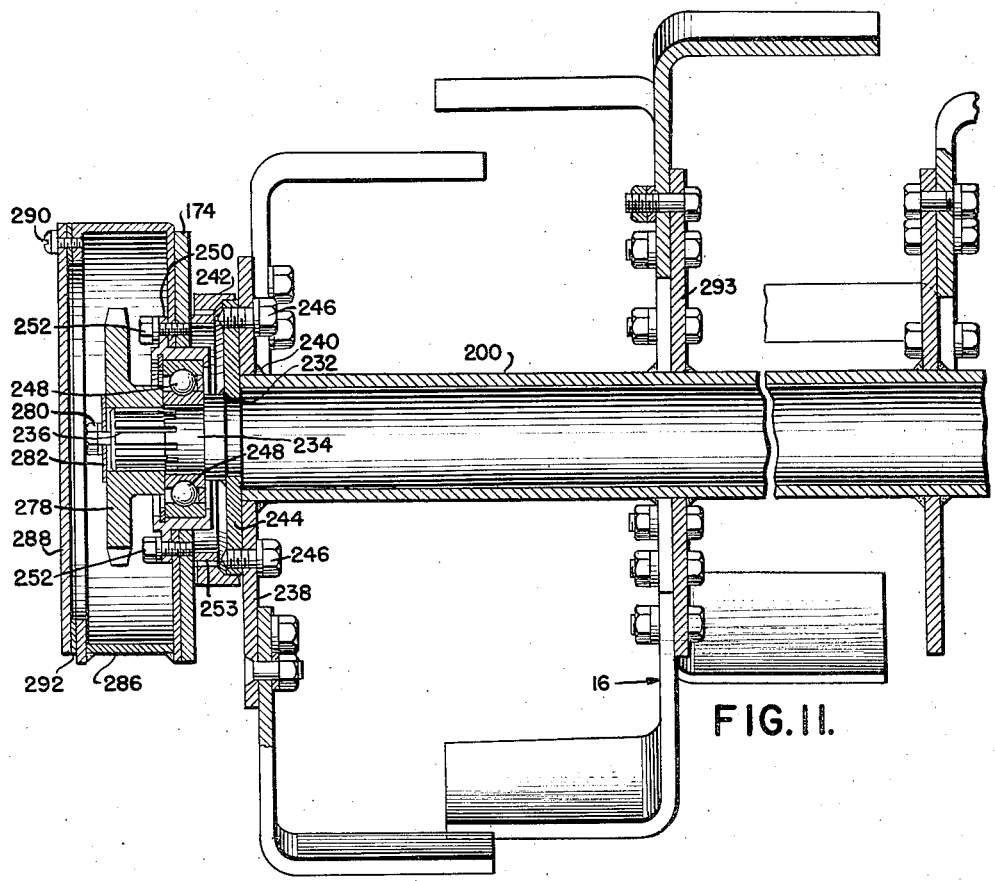
Fig. 11 is a vertical sectional view taken substantially on the plane of line 11—11 in Fig. 11 at the driven end of the shaft of the earth-working element, parts being broken away for clarity.
Figure 12:
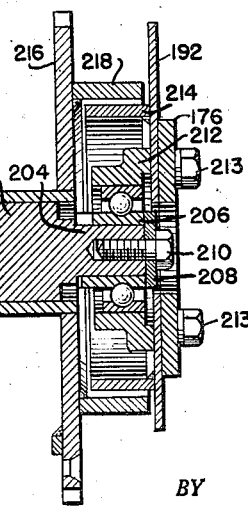
Fig. 12 is a vertical sectional view along the same plane as the section for Fig. 11 but showing the section of the bearing support at the opposing end of the shaft of the earth-working element.
Figure 13:
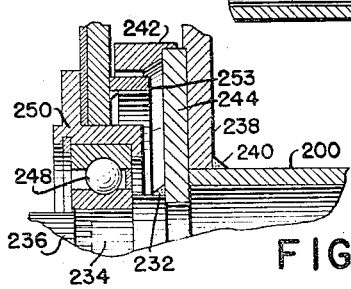
Fig. 13 is an enlarged sectional view showing a portion of the bearing support of Fig. 11.

With reference now to Figures 11 and 13, the bearing support for the other end of the shaft 200 will now be described. The shaft 200 is connected to the driving spline 236 through plate 238 which is welded at 240 to shaft 200 and bolted to plate 244 which in turn is elded at 232 to the spline 236. An outer drum or ring 242 is affixed to the plate 244 and the plate in turn is affixed to the blade-carrying disc 238 by the bolts 246. The ball bearing 248 has its inner race mounted on the plug reduced diameter bearing-receiving portion 234 and its outer race is received and held in the bearing housing element 250. The latter in turn is attached to the frame side element 174 by the bolts 252. The frame element 174 has an inner ring 253 welded thereto in close nested relation with the outer ring 242. As in the case of the bearing mounting for the other end of the shaft 200, there is provided a cutter blade for cooperation with the ring 242, as shown in Figures 5 and 6. An angle iron bracket 254 is welded to the frame side element 174, as at 256, and has threaded openings 258 and 260 therein threadedly receiving the pair of bolts 262. The cutter 264 has elongated slots 266 and 268 therein so as to be adjustably secured to the bracket 254 by the bolts 262, with the cutting edge 270 thereof closely adjacent the surface of the rotatable ring 242. The ring 253 is, of course, fixed and non-rotatable within the ring 242.

For drivingly interconnecting the engine 188 with the shaft 200, there is provided a sprocket 272 fixed to the driven shaft 274 which is selectively connected with the drive shaft of the engine by a clutch operated by the clutch lever 276. A second sprocket 278 is fixed on the splined end 236 of the shaft 200 and a bolt 280 and retainer washer 282 retain the sprocket thereon. A chain 284 is engaged over the pair of sprockets 272 and 278.

The chain and sprocket assembly is completely encased in the elongated housing 286 having a removable closure plate 288 secured thereto by the screws 290, there being a gasket oil seal at 292. The housing is secured to the frame element 174 by the bolts 252 which as above described secure the bearing housing 250 to the frame element. The closed housing 286 contains lubricating oil which also lubricates the bearing 248.

Figures 14, 15 and 16 are now referred to for a showing of a disc and blade assembly of the earth-working element. The disc 293 is irregularly shaped, having nine sides and a central opening at 294 adapted to receive the shaft 200 for securement thereto as by weld. Pairs of adjacent sides as 296, 298; 300, 302; and 304, 306 have openings adjacent thereto, a pair of such openings for each side, and the pair of openings being disposed along a line substantially parallel to the adjacent side. One of the blades 308 utilized is shown in perspective in Figure 16 as being right-angularly shaped including portions 310 and 312. Both portions are beveled to provide a continuous sharp edge 314, 316 for horizontal and vertical cutting or chopping action. The portion 310 has a pointed end, the included angle of which is substantially a right angle, with the edge 318 substantially parallel to the line through the pair of openings 320 and 322 and the edge 324 substantially perpendicular to that line. Pairs of such blades are mounted on the disc 293 by the bolts 326 engaged through the openings. The bolts 326 are provided with thread-free shank portions and threaded ends on which the nuts 328 can be threaded. As shown, the pair of blades 330 and 332 have abutting edges at 324, 334 with the other pairs of blades being similarly arranged. However, the right-angularly extending portions 312, 313 project in opposite directions away from the disc 293.

In Figures 2 and 11, it will be seen that four discs are provided, the two outside discs 216 and 238 having their right-angularly extending portions extending inwardly whereas the two centrally disposed discs have alternate blades extending in alternate directions so as to have overlapping of the blades across the entire transverse length of the earth-working element to provide an uninterrupted working zone.

When it is desired to cultivate a field the instant agricultural implement is pivotally connected to the draw bar or similar means of a tractor or other propelling vehicle, and the electrical cable 168 of the implement is connected with the tractor battery. The chain 78 is disconnected at its upper end and with the engine 188 operating, the operator depresses the operating handle 128 until the desired depth of working is being achieved, this being accomplished by relief of pressure in the cylinder 74 through the valve 124 to the tank 102 until the piston and rod have dropped a sufficient amount to lower the earth-working element connected to the rod by the pin at 87 (Figs. 1 and 8). While the tractor moves forwardly, the discs and the blades carried thereby will be rotating at a relatively high speed, chopping, comminuting and mixing grass and so forth with the earth churned up thereby so as to give effective cultivation. As the earth-working element passes over uneven contour, it is free to pivot upwardly about the frame connection to the tractor. Furthermore, should an obstruction be met, the breather 88 at the upper end of the piston permits the earth-working element to pivot upwardly about its pivotal axis at 44 and relative to the main frame. The element can be adjusted by utilization of the cylinder 74 to cut five inches below the earth surface or to raise the element nine inches above the earth surface for clearance, by way of example.

When it is desired to raise the earth-working element, the handle 128 is raised contacting and closing switch 126 (Fig. 8) thereby pumping fluid past the check valve 109 into the lower end of the cylinder 74. When the requisite lifting of the earth-working element has been effected the handle is released, opening the switch and rendering the pump 104 inoperative. As a safety means, the relief valve 111 opens should the pressure in the cylinder exceed a set amount, as by continued pumping of fluid after the piston is in its uppermost position. The chain 78 is utilized to hold the earth-working element in its raised position while transporting the implement from field to field and to provide instantaneous depth control after original adjustment for depth.

With reference to Figure 14, it will be seen that as each blade enters the earth, the plane of cutting edges 314 and 316 and the trailing beveled face of the blade will be substantially normal to the earth surface for best results and so as to achieve self-sharpening of the blades which are made of a heat-treated alloy steel.

As the blade 332' enters the earth, the moment imparted thereto will be in the direction of the arrows 336 and acting against the edge 324' and along a line through the pair of bolts 326' which thereby helps take the load off the bolts holding the blade 332'. As the blade 330' enters the earth, the moment imparted thereto will exert a force in the direction of the arrows 338 and acting against the edge 334' and along a line between the two bolts holding the blade 332' so as to distribute the load of the blade 330' over all four bolts.

As the implement traverses the field being cultivated, the cutters 224 and 264 (Figs. 5, 6 and 7) will be coacting with the rings 218 and 242, respectively, to prevent accumulation of grass thereon.

Although the hydraulic cylinder has been shown to be operated by control means on the implement, obviously, if desired, such control could be effected by utilization of the hydraulic system on the propelling vehicle.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim or that form their functional as well as conjointly cooperative equivalents, are therefore intended to be embraced by the claim.

We claim:

An agricultural assembly of the class described, having a pivoted frame supported from a ground-engaging wheel at one end of the frame, a power unit on the frame, a rotatable earth-working element supported from the frame and driven by the power unit, a cover in fixed relation to the earth-working element, and controllable means associated with the cover for raising and lowering the earth-working element toward and away from the earth, said pivoted frame including a pair of longitudinally extending arcuated bars joined at one end by a vertically disposed sleeve rotatably receiving the pivot shaft of said ground-engaging wheel and having downwardly extending portions at the opposing end joined by a horizontal cross bar, a platform comprised of side frame elements joined in spaced relation relation by cross bars and pivoted to said first mentioned cross bar, said power unit being supported on said platform for movement therewith, the spacing of said longitudinally extending arcuated bars being sufficient to permit movement of said power unit therebetween and between said downwardly extending portions.

References Cited in the file of this patent

UNITED STATES PATENTS

| | | |
|---|---|---|
| 2,160,524 | Sutherland | May 30, 1939 |
| 2,192,762 | Vincze | Mar. 5, 1940 |
| 2,287,479 | Kelsey | June 23, 1942 |
| 2,491,892 | Claus | Dec. 20, 1949 |
| 2,559,996 | Pettman | July 10, 1951 |
| 2,586,490 | Thompson | Feb. 19, 1952 |
| 2,590,011 | Hawkins | Mar. 18, 1952 |
| 2,600,332 | Rude et al. | June 10, 1952 |
| 2,657,620 | Meeks | Nov. 3, 1953 |
| 2,686,464 | Mang | Aug. 17, 1954 |
| 2,691,933 | Emerson | Oct. 19, 1954 |

FOREIGN PATENTS

| | | |
|---|---|---|
| 354,311 | Great Britain | Aug. 4, 1931 |
| 672,451 | Great Britain | May 21, 1952 |